(No Model.) 2 Sheets—Sheet 1.
W. H. BASTIN.
MEASURING VESSEL.
No. 503,571. Patented Aug. 22, 1893.
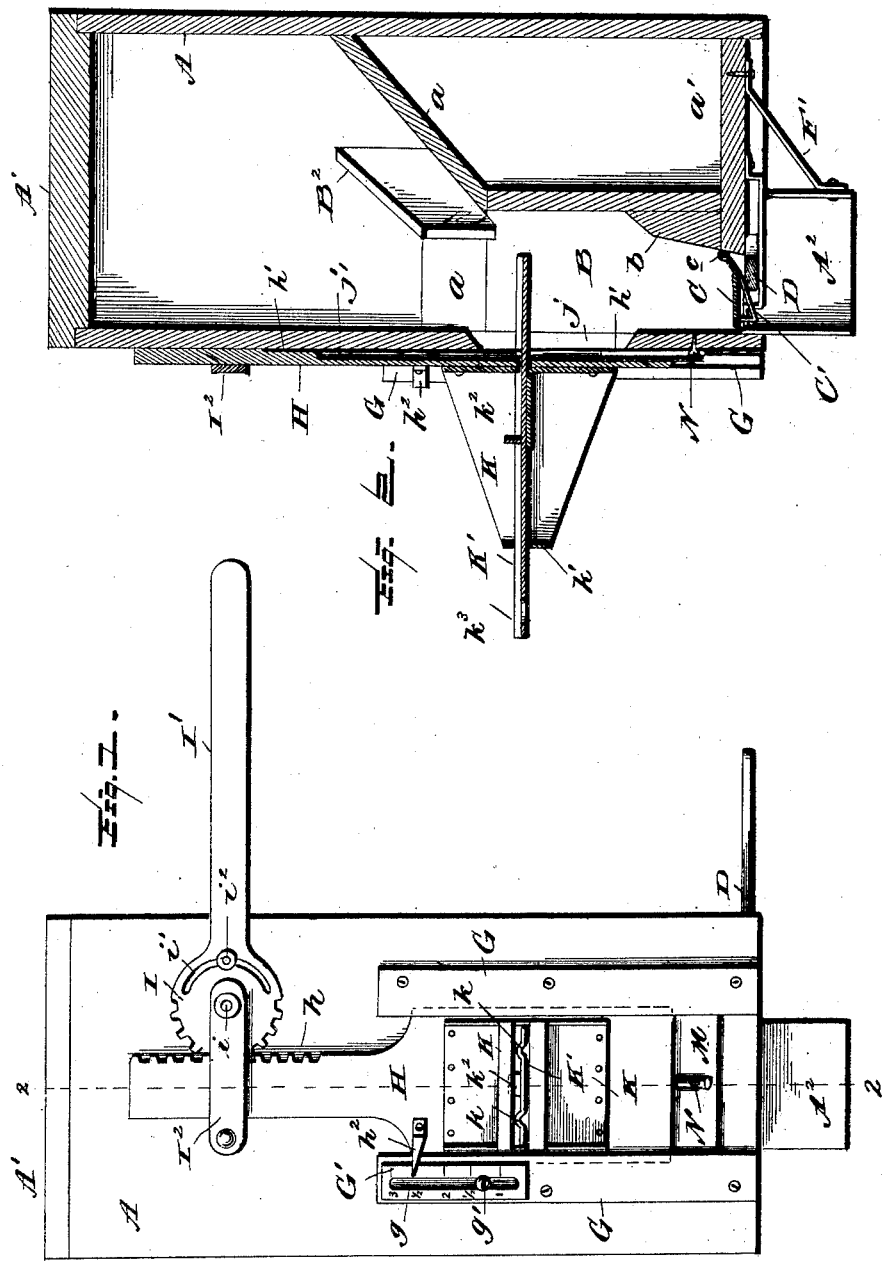
Witnesses
L. C. Hills
E. H. Bond
Inventor
William H. Bastin
By E. B. Stocking
Attorney (No Model.) 2 Sheets—Sheet 2.
W. H. BASTIN.
MEASURING VESSEL.
No. 503,571. Patented Aug. 22, 1893.
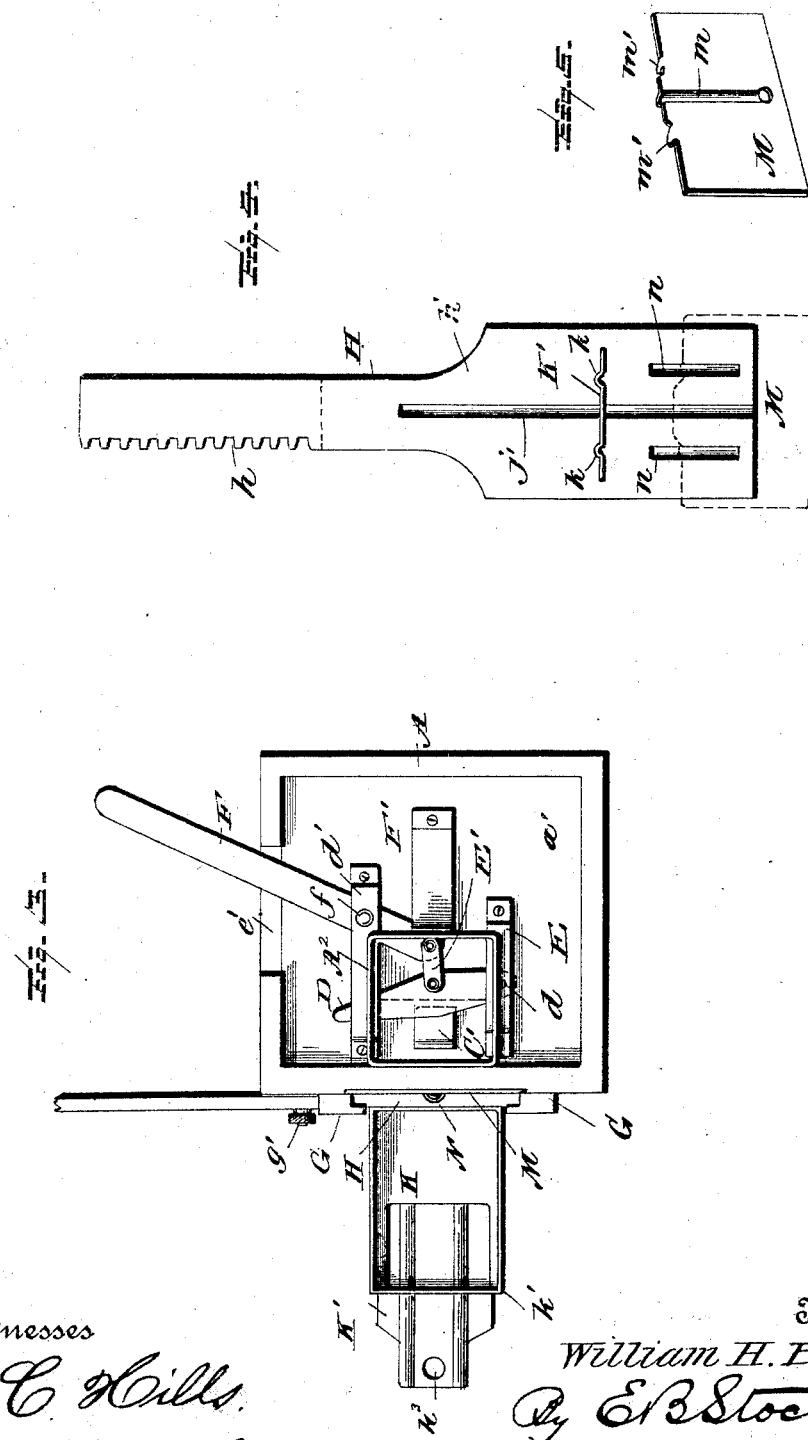
Witnesses
L. C. Hills.
E. H. Bond.
Inventor:
William H. Bastin.
By E. B. Stocking
Attorney

UNITED STATES PATENT OFFICE.

WILLIAM H. BASTIN, OF MURPHYSBOROUGH, ILLINOIS.

MEASURING-VESSEL.

SPECIFICATION forming part of Letters Patent No. 503,571, dated August 22, 1893.

Application filed February 27, 1893. Serial No. 463,867. (No model.)

*To all whom it may concern:*

Be it known that I, WILLIAM H. BASTIN, a citizen of the United States, residing at Murphysborough, in the county of Jackson and State of Illinois, have invented certain new and useful Improvements in Measuring Devices for Coffee, &c., of which the following is a specification, reference being had therein to the accompanying drawings.

This invention relates to certain new and useful improvements in measuring devices of that class employed for measuring coffee, rice and other articles, and it has for its objects among others to provide a simple and convenient case or receptacle for holding and measuring coffee, spices, or any other desired commodity by which weighing of the articles is dispensed with. It may be used in stores, or it may be in a pantry or kitchen where it will be found most useful to the housewife. I provide a suitable box or case having a discharge spout the entrance to which from the box or case is closed by a gravity door which is held up by suitable mechanism the withdrawal of which allows the said door to drop by its own weight aided by the weight of the material thereon. Wings are provided within the box or case to hold the bulk of the material against falling onto the side or cut-off. The slide or cut-off is carried by an adjustable part carrying an index operating in conjunction with a scale to determine the amount to be measured. This scale is adjustable as is also the amount of movement of the said part to regulate the amount to be discharged according to the specific gravity of the material being measured.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a face view of my improved measuring device. Fig. 2 is a central vertical section through the same on the line 2—2 of Fig. 1. Fig. 3 is a bottom plan thereof. Fig. 4 is a rear view of the vertical slide. Fig. 5 is a perspective view of the adjustable stop detached or removed from the device.

Like letters of reference indicate like parts throughout the several views in which they appear.

Referring now to the details of the drawings by letter, A designates the box or receptacle of any suitable material and shape, preferably substantially rectangular, and having a suitable cover or top A'. It is designed to be supported in any desired position in any suitable manner.

Within the box or receptacle are provided the inclined portions $a$ which serve to conduct the material from the upper portion to the discharge spout through the measuring chamber B which is thus formed to occupy but a portion of the dimensions of the box or receptacle as seen in Fig. 2. The discharge spout $A^2$ is secured in any suitable manner to the lower end of the measuring chamber and extends for any desired distance below the bottom $a'$ of the box as seen in Fig. 2. The bottom of the measuring chamber is normally closed by a door C which is pivoted at one edge or hinged in any suitable manner as seen at $c$ to swing downward and the normal tendency of this door is to drop, but it is held up in the following manner:—Upon the under side of this door is an inclined or cam-shaped projection C', beneath which is arranged a plate or arm D pivoted at one end as seen at $d$ in Fig. 3 between the arm or guide E which is secured to the bottom of the box while its other end moves between the bottom of the box and the guide $d'$. This plate or arm is actuated by the lever F which is pivoted as at $f$ to the guide $d'$ and connected with the said plate or arm near its center by the link E' all as clearly shown in Fig. 3. This lever is extended and works through an opening $e'$ in the wall of the box or receptacle beneath the bottom as seen in Fig. 3. When the arm or plate is in the position shown in Fig. 3 it will support the door and prevent its downward movement, but when the lever is actuated to move the said arm or plate away from the door the latter falls by its own weight aided by that of the coffee or other material and discharges its contents into the spout from which it may be received into a bag or other receptacle. Supposing the door to be open the lever is moved to throw the arm or plate against the inclined or cam projection which will move the door into its closed position.

F' designates a brace for the discharge spout as seen in Figs. 2 and 3. It extends in an inclined direction, being secured at one end to the said discharge spout and at the other end to the bottom of the box or receptacle in any suitable manner.

In order to insure that the material will all fall upon the door I may provide within the measuring chamber just above the said door upon the side nearest its pivot a tapered strip $b$ as seen in Fig. 2.

$B^2$ are wings within the box or receptacle above the entrance to the measuring chamber and serving to hold back the major portion of the material in the upper portion of the receptacle and prevent it from crowding into the measuring chamber.

Upon the front face of the box or receptacle are the guides G between which the slide H is designed to reciprocate. Upon one of these guides is affixed a scale plate G' provided with a longitudinal slot $g$ which receives a screw $g'$ having a flat head and by which the said scale plate can be easily adjusted when desired for a purpose which will soon be made apparent. The upper end of this slide is provided with teeth $h$ to form a rack bar as seen in Figs. 1 and 4, which is engaged and actuated by a toothed wheel I journaled on a central stud or pivot $i$ held in the wall of the box or receptacle near its upper end as seen in Fig. 1 and provided with a suitable handle or lever portion I' as is also shown in said Fig. 1. The shaft or pivot of the wheel is also held in one end of the bar $I^2$ which forms a guide for the upper end of the slide and also serves to keep the toothed wheel in its proper plane. The wheel is provided with a curved slot $i'$ through which passes a set screw $i^2$ which is designed to be tightened against the same to hold it in its adjusted position. The slide H carries an index finger or indicator $h^2$ as seen in Fig. 1 which acts in conjunction with the scale plate G' to designate the proper distance the slide should be moved. The front wall of the case is open opposite the slide as seen at $j$ in Fig. 2 and the rear face of the slide is provided with a longitudinal groove $j'$ as is also seen in said figure as well as in Fig. 4, this groove being for a purpose which will soon appear.

Mounted upon the front face of the slide is the horizontal guide K in which is fitted to reciprocate the cut-off K' of any desired character being provided when necessary with corrugations or ribs $k$ to strengthen the same and working in corresponding openings as seen in Figs. 1 and 4, they serve to better guide the cut-off in its reciprocations. This cut-off is mounted to reciprocate in the guides in the slide and to cut off the supply of the material to the measuring chamber as will be readily understood from Fig. 2. The guide K has at its front end the cross portion $k'$ which is slotted as seen in Fig. 2 and the cut-off is provided with a stop $k^2$ to engage the same to limit its outward movement; it may be also provided with a finger hole $k^3$ or any other means whereby it can be readily manipulated.

With the parts constructed and arranged substantially as above described the operation is as follows:—The material is placed in the receptacle and is prevented from crowding down into the measuring chamber by the wings which sustain the greater portion of the weight thereof; the slide is then moved until the index indicates the amount desired to be measured, one pound, two pounds, or whatever the quantity may be, and then the cut-off is moved inward to shut off the material above; the moving of the slide until the index indicates the desired amount brings the slide cut-off into position to measure off just that amount. The lever F is then moved to bring the arm or plate D from under the door C when the latter falls by its own weight aided by that of the material on the same; the material falls through the spout into a bag or any other receptacle placed to receive it.

In order to change the device for measuring any article of a different specific gravity from that for which it is being used I provide an adjustable plate M having a longitudinal groove $m$ and at its upper end lateral projections $m'$ which are designed to engage in the grooves or slots $n$ in the lower end of the slide H as seen in Fig. 4. This plate is limited in its movement by a pin, screw or other means N passed through a hole $n'$ at the lower end of the groove $m$ as seen in Fig. 2. The slide is limited in its movements by the projections $m'$ and the central rib formed by the groove $m$ works in the groove $j'$ of the plate or slide H. By changing the position of the plate M the movement of the slide may be varied according to the specific gravity of the material to be measured, the scale plate G' being correspondingly adjusted.

Modifications in detail may be resorted to without departing from the spirit of the invention or sacrificing any of its advantages. I may sometimes use a thin strip of rubber $h'$ with a slit to allow of the passage of the cut-off as seen in Fig. 2 to prevent escaping of the material with the cut-off.

What I claim as new is—

1. In a measuring device of the character described, a vertically reciprocative slide carrying a reciprocative cut-off working at right angles thereto in guides thereon, as set forth.

2. In a measuring device of the character described, a vertically-reciprocative slide mounted to move in guides and having mounted to slide therethrough and into the chamber a horizontally-reciprocative cut-off, as set forth.

3. In a measuring device, the combination with the receptacle having a measuring chamber, of a hinged door at the bottom of said chamber, with cam-shaped projections and a movable plate and actuating devices arranged beneath said door to hold the same closed, as set forth.

4. The combination with the receptacle having a measuring chamber and a hinged door at its lower end, of the devices for holding said door in its closed position, the vertically reciprocative slide, and the horizontally-reciprocative cut-off carried by said slide and mounted to move thereon and into the measuring chamber, as set forth.

5. The combination with the receptacle with its measuring chamber, of the slide mounted on the chamber and carrying the cut-off, and means on the outer wall of the chamber for adjusting the slide and cut-off to measure materials of varying specific gravity, as set forth.

6. The combination with the receptacle with its measuring chamber, of the slide mounted to move in guides on the chamber, the cut-off carried thereby, to move at right angles thereto, the adjustable scale plate on the outer wall of the chamber and the means for limiting the movement of the slide, as and for the purpose specified.

7. The combination with the vertically-reciprocative slide and means mounted on the wall of the chamber for actuating the same, of the cut-off carried by and movable in the slide at right angles thereto, as set forth.

8. The combination with the receptacle with its hinged door, of the plate pivoted at one end to move beneath the door, the inclined projection upon the under side of the door, and means pivotally connected with said plate near its center for moving said plate, as and for the purpose specified.

9. The combination with the receptacle, of the slide fitted to move in guides thereon, the cut-off movable in a guide on the slide and having a stop for limiting its outward movement by contact with a portion of the guide in which the cut-off moves, as set forth.

10. The combination with the receptacle and the slide, of the plate adjustably mounted on the chamber and having lateral projections for limiting the movement of the slide, as set forth.

11. The combination with the receptacle, of the slide movable in guides thereon, and the adjustable plate having portions engaging grooves in the slide to limit the movement thereof, substantially as specified.

12. The combination with the receptacle, of the slide having a rack portion, the cut-off carried by said slide, the toothed wheel pivoted to the outer wall of the chamber and provided with a lever and curved slot, and the set screw working in said slot, substantially as and for the purpose specified.

In testimony whereof I affix my signature in presence of two witnesses.

WILLIAM H. BASTIN.

Witnesses:
 GEO. W. HILL,
 THOS. M. LOGAN.